United States Patent
Okumura

(10) Patent No.: US 10,620,520 B2
(45) Date of Patent: Apr. 14, 2020

(54) WAVELENGTH CONVERSION ELEMENT, WAVELENGTH CONVERSION SYSTEM, LIGHT SOURCE APPARATUS, AND PROJECTOR

(71) Applicant: SEIKO EPSON CORPORATION, Tokyo (JP)

(72) Inventor: Osamu Okumura, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/114,557

(22) Filed: Aug. 28, 2018

(65) Prior Publication Data

US 2019/0064644 A1 Feb. 28, 2019

(30) Foreign Application Priority Data

Aug. 29, 2017 (JP) .................................. 2017-164034

(51) Int. Cl.
*G03B 21/20* (2006.01)
*G03B 33/12* (2006.01)

(52) U.S. Cl.
CPC ......... *G03B 21/2066* (2013.01); *G03B 21/20* (2013.01); *G03B 21/204* (2013.01); *G03B 33/12* (2013.01)

(58) Field of Classification Search
CPC .............. G03B 21/2066; G03B 21/204; G03B 21/2093; G03B 33/12
See application file for complete search history.

(56) References Cited

U.S. PATENT DOCUMENTS

| 2005/0270775 A1 | 12/2005 | Harbers et al. | |
| 2014/0176914 A1* | 6/2014 | Mueller | F21S 10/007 353/31 |

FOREIGN PATENT DOCUMENTS

| JP | 2005-347263 A | | 12/2005 |
| JP | 2011-209366 A | | 10/2011 |
| JP | 2011209366 A | * | 10/2011 |
| JP | 2014-203852 A | | 10/2014 |
| JP | 5961343 B2 | | 8/2016 |

* cited by examiner

Primary Examiner — Isiaka O Akanbi
Assistant Examiner — Danell L Owens
(74) Attorney, Agent, or Firm — Oliff PLC

(57) ABSTRACT

A wavelength conversion element includes a phosphor layer that emits fluorescence when excitation light is incident on the phosphor layer, a base having a reflection layer, and a filter provided on a side of the phosphor layer that is the side opposite the reflection layer. The filter is so configured that the reflectance of light that belongs to a wavelength region from the wavelength of the excitation light to the wavelength of the fluorescence and is incident on the filter at right angles is minimized at a first wavelength, and the first wavelength is located between the peak wavelength of the excitation light and the peak wavelength of the fluorescence.

20 Claims, 10 Drawing Sheets

WAVELENGTH CONVERSION ELEMENT, WAVELENGTH CONVERSION SYSTEM, LIGHT SOURCE APPARATUS, AND PROJECTOR

BACKGROUND

1. Technical Field

The present invention relates to a wavelength conversion element, a wavelength conversion system, a light source apparatus, and a projector.

2. Related Art

In recent years, as a light source apparatus incorporated in a projector or any other apparatus, there is a known apparatus including a light source and a wavelength conversion element that receives light emitted from the light source and emits light having a wavelength different from the wavelength of the light from the light source (see JP-A-2005-347263, for example).

The apparatus (illuminator) described in JP-A-2005-347263 includes a light source, such as an LED, a color separation element, a wavelength conversion element, and a luminance improving structure. The illuminator further includes collimators, one disposed between the light source and the color separation element and the other disposed between the color separation element and the wavelength conversion element.

The color separation element reflects primary light emitted from the light source and transmits converted light emitted from the wavelength conversion element.

The wavelength conversion element is provided on a high-reflectance substrate, absorbs the primary light reflected off the color separation element, and emits the converted light.

The luminance improving structure is so disposed as to cover the wavelength conversion element. The luminance improving structure is so formed as to transmit the primary light emitted from the light source over a wide range of the angle of incidence of the primary light but transmit the converted light emitted from the wavelength conversion element over a limited angle of incidence of the converted light.

The converted light radiated from the wavelength conversion element over a wide angular range is reflected off the luminance improving structure, absorbed again by the wavelength conversion element, and radiated again therefrom. The luminance of the light outputted from the illuminator is increased based on the configuration in which the luminance improving structure outputs the converted light over a narrow angular range.

The apparatus described in JP-A-2005-347263, however, undesirably could not efficiently use the primary light incident over the wide range of the angle of incidence. That is, it is believed that the primary light incident on the wavelength conversion element does not all contribute to the conversion into the converted light; part of the primary light travels in the form of the primary light toward the luminance improving structure but exits out of the luminance improving structure without used to produce the converted light because the luminance improving structure transmits the primary light over the wide range of the angle of incidence. Further, to guide the primary light to the luminance improving structure over the wide range of the angle of incidence, the apparatus described in JP-A-2005-347263 has another problem of a large size of the corresponding collimator.

SUMMARY

An advantage of some aspects of the invention is to solve at least a part of the problems described above, and the invention can be implemented as the following forms or application examples.

Application Example 1

A wavelength conversion element according to this application example includes a phosphor layer that emits fluorescence when excitation light is incident on the phosphor layer, a base having a reflection layer, and a filter provided on a side of the phosphor layer that is a side opposite the reflection layer. The filter is so configured that reflectance of light that belongs to a wavelength region from a wavelength of the excitation light to a wavelength of the fluorescence and is incident on the filter at right angles is minimized at a first wavelength, and the first wavelength is located between a peak wavelength of the excitation light and a peak wavelength of the fluorescence.

According to the configuration described above, the wavelength conversion element, in which the base reflects the fluorescence emitted from the phosphor layer excited by the excitation light incident thereon, can output the reflected fluorescence. That is, a reflective wavelength conversion element that emits fluorescence through the side on which the excitation light is incident can be provided.

Further, the wavelength conversion element has a spectral characteristic showing that the reflectance of the light that belongs to the wavelength region described above and is incident at right angles is minimized at the first wavelength located between the peak wavelength of the excitation light and the peak wavelength of the fluorescence. That is, the filter has a V-letter-shaped spectral characteristic (reflection characteristic) showing that the reflectance of the light incident on the filter at right angles at each of the peak wavelength of the excitation light and the peak wavelength of the fluorescence on both sides of the first wavelength is higher than the reflectance at the first wavelength. The spectral characteristic changes in accordance with the magnitude of the angle of incidence of the light incident on the filter. The filter, when it is formed, for example, of a dielectric thin film, is characterized in that the V-letter-shaped spectral characteristic is shifted toward a shorter wavelength side as the angle of incidence of the light incident on the filter increases (shift characteristic). The shift characteristic allows the filter to function as follows: That is, out of the excitation light once incident on the phosphor layer but directed from the phosphor layer toward the filter without contribution to generation of the fluorescence, excitation light incident on the filter at a large angle of incidence can be reflected and directed toward the phosphor layer again to cause the phosphor layer to emit the fluorescence. Further, out of the fluorescence emitted from the phosphor layer and directed toward the filter, fluorescence incident on the filter at a large angle of incidence can be reflected so that the spread of the fluorescence to be outputted is suppressed. The wavelength conversion element provided in this application example can therefore effectively use the incident excitation light to improve the fluorescence emission efficiency and suppress the spread of the emitted fluorescence to output high-light-flux-density fluorescence.

Application Example 2

In the wavelength conversion element according to the application example described above, it is preferable that the filter is so configured that the reflectance of light that belongs to the wavelength region and is incident at a first angle of incidence is minimized at the peak wavelength of the excitation light.

According to the configuration described above, the filter efficiently transmits the component that forms the excitation light and is incident at the first angle of incidence. The wavelength conversion element provided in the application example can therefore effectively use the excitation light formed of the component incident at the first angle of incidence and therefore having high optical intensity to emit the fluorescence.

Application Example 3

A wavelength conversion element according to this application example includes a phosphor layer that emits fluorescence when excitation light is incident on the phosphor layer, a base having a reflection layer, and a filter provided on a side of the phosphor layer that is a side opposite the reflection layer, and the filter transmits excitation light incident on the filter at right angles out of the excitation light incident on the phosphor layer and fluorescence incident on the filter at right angles out of the fluorescence emitted from the phosphor layer and reflects fluorescence incident on the filter at a second angle of incidence out of the fluorescence emitted from the phosphor layer in such a way that optical intensity of the reflected fluorescence is higher than optical intensity of transmitted fluorescence.

According to the configuration described above, the wavelength conversion element, which includes the filter described above, can be a reflective wavelength conversion element that reliably causes the excitation light incident on the filter at right angles to travel to the phosphor layer and reliably transmits and outputs the fluorescence incident from the phosphor layer on the filter at right angles.

Further, the filter reflects part of the fluorescence incident on the filter at the second angle of incidence. The filter can therefore cause a large part of the fluorescence incident on the filter at angles of incidence greater than or equal to the second angle of incidence to travel toward the phosphor layer because the shift characteristic allows an increase in the reflectance of the fluorescence incident on the filter at the angles of incidence greater than or equal to the second angle of incidence. The wavelength conversion element provided in the application example can suppress the spread of the fluorescence emitted from the phosphor layer to output high-light-flux-density fluorescence.

Application Example 4

In the wavelength conversion element according to the application example described above, it is preferable that the fluorescence is light containing green light and highly visible red light, and that the filter reflects at least part of red light incident on the filter at right angles and less visible than the highly visible red light.

According to the configuration described above, the filter transmits the excitation light and the fluorescence incident on the filter at right angles and reflects at least part of the light having a wavelength close to the long wavelength side in the wavelength band of the fluorescence and incident at right angles. The filter can therefore be configured to have a spectral characteristic showing that transmission of the fluorescence is switched to reflection thereof or vice versa in a narrow wavelength band. The wavelength conversion element provided in the application example can therefore more effectively use the incident excitation light to emit fluorescence and efficiently suppress the spread of the emitted fluorescence to output higher-light-flux-density fluorescence.

Application Example 5

A wavelength conversion element according to this application example includes a phosphor layer that emits fluorescence when excitation light is incident on the phosphor layer, a first filter provided on a side of the phosphor layer that is a side on which the excitation light is incident, a second filter provided on a side of the phosphor layer that is a side opposite the first filter, and a base on which the phosphor layer on which the first filter and the second filter are provided is provided and which transmits the fluorescence. The first filter transmits excitation light incident on the first filter at right angles out of the excitation light incident on the phosphor layer, reflects excitation light incident on the first filter at a third angle of incidence out of the excitation light incident on the phosphor layer in such away that optical intensity of the reflected excitation light is higher than optical intensity of transmitted excitation light, and reflects fluorescence incident on the first filter at right angles out of the fluorescence emitted from the phosphor layer, and the second filter transmits fluorescence incident on the second filter at right angles out of the fluorescence emitted from the phosphor layer, reflects the fluorescence incident on the second filter at a fourth angle of incidence in such a way that optical intensity of the reflected fluorescence is higher than optical intensity of transmitted fluorescence, and reflects excitation light incident on the second filter at right angles out of the excitation light incident on the phosphor layer.

According to the configuration described above, the wavelength conversion element can cause the excitation light incident via the first filter to travel toward the phosphor layer to cause the phosphor layer to emit fluorescence, cause the fluorescence to transmit through the second filter, and output the fluorescence to the side opposite the side on which the excitation light is incident. That is, a transmissive wavelength conversion element that emits fluorescence toward the side opposite the excitation light incident side with respect to the wavelength conversion element can be provided.

Since the wavelength conversion element is so configured that the first filter reflects the fluorescence emitted from the phosphor layer and incident on the first filter, the fluorescence can be efficiently outputted toward the light exiting side. Since the wavelength conversion element is further so configured that the second filter reflects the excitation light having passed through the phosphor layer without contribution to the generation of the fluorescence, the efficiency of conversion into the fluorescence can be increased.

Further, the first filter reflects the excitation light incident thereon at the third angle of incidence in such a way that the optical intensity of the reflected excitation light is higher than the optical intensity of the transmitted excitation light. Part of the excitation light incident from the phosphor layer without contribution to the generation of the fluorescence on the first filter at the third angle of incidence can therefore be directed toward the phosphor layer again, and the excitation light allows the phosphor layer to emit the fluorescence. Further, since the second filter reflects the fluorescence incident thereon at the fourth angle of incidence in such a way that the optical intensity of the reflected fluorescence is higher than the optical intensity of the transmitted fluorescence, part of the fluorescence directed from the phosphor layer toward the second filter at the fourth angle of incidence can be reflected.

The wavelength conversion element provided in the application example can therefore effectively use the incident excitation light to emit fluorescence and suppress the spread of the emitted fluorescence to output high-light-flux-density fluorescence.

Application Example 6

A wavelength conversion system according to this application example includes the wavelength conversion element described in any of the application examples described above and a pickup system on which the fluorescence emitted from the wavelength conversion element is incident.

According to the configuration described above, since the wavelength conversion system includes the wavelength conversion element that outputs fluorescence the spread of which is suppressed, the fluorescence emitted from the wavelength conversion element can be efficiently taken into the pickup system, and the size of the pickup system can be reduced.

Application Example 7

A light source apparatus according to this application example includes a light emitter that outputs excitation light and the wavelength conversion element described in any of the application examples described above.

According to the configuration described above, the light source apparatus, which includes the wavelength conversion element described above, can efficiently use the excitation light outputted from the light emitter and suppress the spread of the fluorescence to output high-luminance fluorescence.

Application Example 8

A projector according to this application example includes the light source apparatus described above, a light modulator that modulates light outputted from the light source apparatus, and a projection optical apparatus that projects the light modulated by the light modulator.

According to the configuration described above, the projector, which includes the light source apparatus described above, can project a brighter image and can perform projection on a large projection surface under a brighter environment.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
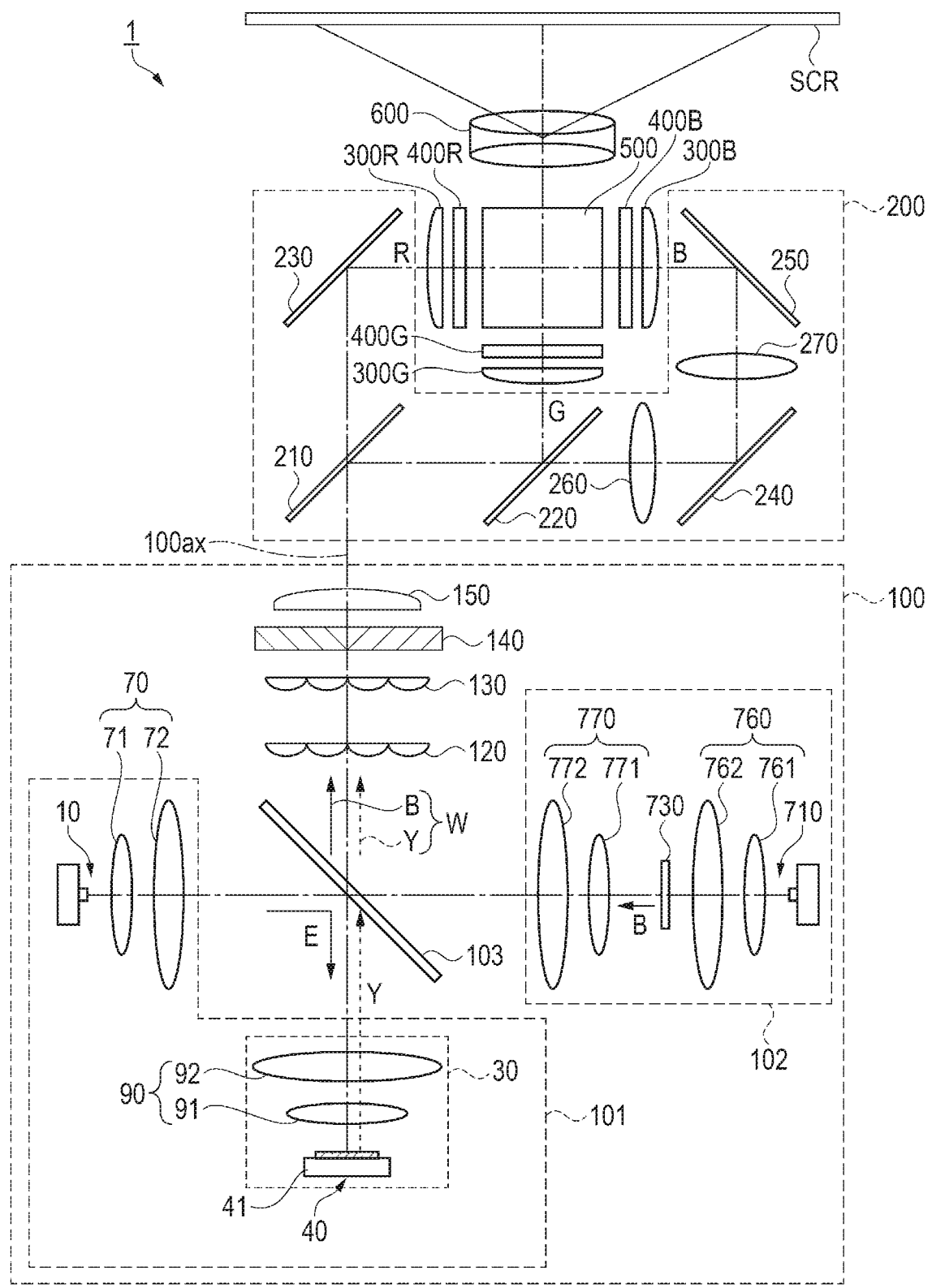
FIG. 1 is a diagrammatic view showing the optical system of a projector according to a first embodiment.

Embodiments of the invention will be described below with reference to the drawings. A projector according to each of the embodiments modulates light emitted from a light source in accordance with image information and projects an image on a projection surface, such as a screen. In the following drawings, each component is so drawn at a dimension or a scale different from an actual value as to be large enough to be recognizable in the drawings.

First Embodiment

FIG. 1 is a diagrammatic view showing the optical system of a projector 1 according to the present embodiment.

The projector 1 includes an illuminator 100, a color separation/light guide system 200, light modulators 400R, 400G, and 400B, a cross dichroic prism 500, and a projection optical apparatus 600, as shown in FIG. 1.

The illuminator 100 includes a first light source apparatus 101, a second light source apparatus 102, a dichroic mirror 103, lens arrays 120 and 130, a polarization conversion element 140, and a superimposing lens 150.

The first light source apparatus 101 includes a light emitter 10, a collimation system 70, and a wavelength conversion system 30.

The light emitter 10 includes one or more semiconductor lasers and outputs excitation light E (blue light having an emitted light intensity peak wavelength of about 455 nm). The light emitter 10 can instead include a semiconductor laser that emits excitation light E having an emitted light intensity peak wavelength other than 455 nm.

The collimation system 70 includes lenses 71 and 72 and roughly parallelizes the light outputted from the light emitter 10. The collimation system. 70 may instead include one lens or three or more lenses.

The dichroic mirror 103 is so disposed as to incline by 45° with respect to the optical axis of the light emitter 10 and has the function of reflecting the excitation light E and the blue light and transmitting yellow light containing red light and green light (fluorescence Y, which will be described later). The dichroic mirror 103 reflects the excitation light E outputted from the light emitter 10 and roughly parallelized by the collimation system 70.

The wavelength conversion system 30 includes a collimation/light collection system 90 and a wavelength conversion element 40.

The collimation/light collection system. 90 includes, for example, lenses 91 and 92. The collimation/light collection system 90 has the function of collecting the excitation light E reflected off the dichroic mirror 103 and directing the collected excitation light E to a phosphor layer 42, which will be described later, of the wavelength conversion element 40 and the function of roughly parallelizing the fluorescence Y (yellow light) emitted from the phosphor layer 42. The collimation/light collection system 90 corresponds to a pickup system on which the fluorescence Y emitted from the wavelength conversion element 40 is incident. The collimation/light collection system 90 may instead include one lens or three or more lenses.

The wavelength conversion element 40, although will be described later in detail, includes a base 41, the phosphor layer 42, and a filter 43 (see FIG. 2). The wavelength conversion element 40 emits the fluorescence Y when the excitation light E collected by the collimation/light collection system 90 excites the phosphor in the phosphor layer 42. The emitted fluorescence Y is reflected off the base 41 toward the collimation/light collection system 90. As described above, the wavelength conversion element 40 is configured as a reflective wavelength conversion element that outputs the fluorescence Y via the side on which the excitation light E is incident.

The second light source apparatus 102 is disposed on the side opposite the collimation system 70 with respect to the dichroic mirror 103, as shown in FIG. 1. The second light source apparatus 102 includes a light emitter 710, a light collection system 760, a scatter plate 730, and a collimation system 770.

The light emitter 710 includes one or more semiconductor lasers and outputs blue light B. The semiconductor laser provided in the light emitter 710 can be the same kind of semiconductor laser as that provided in the light emitter 10.

The light collection system 760 includes lenses 761 and 762, roughly collects the blue light B outputted from the light emitter 710, and directs the collected blue light B to the scatter plate 730.

The scatter plate 730 scatters the blue light B incident thereon in such a way that the scattered blue light B has a light orientation distribution similar to the light orientation distribution of the fluorescence Y outputted from the wavelength conversion element 40. The scatter plate 730 can be made, for example, of ground glass (optical glass).

The collimation system 770 includes lenses 771 and 772 and roughly parallelizes the light from the scatter plate 730.

The light parallelized by the collimation system 770 is reflected off the dichroic mirror 103 toward the side opposite the collimation/light collection system 90.

The fluorescence Y outputted from the first light source apparatus 101 passes through the dichroic mirror 103 and combined with the blue light B outputted from the second light source apparatus 102 and reflected off the dichroic mirror 103 into white light W, which exits toward the lens array 120.

The lens arrays 120 and 130 and the superimposing lens 150 form an optical integration system. Specifically, the lens array 120 includes a plurality of first lenslets that divide the white light W through the dichroic mirror 103 into a plurality of sub-light fluxes. The plurality of first lenslets are arranged in a matrix in a plane perpendicular to the optical axis 100ax of the illuminator 100.

The lens array 130 includes a plurality of second lenslets corresponding to the plurality of first lenslets of the lens array 120. The lens array 130, along with the superimposing lens 150, forms images of the first lenslets of the lens array 120 in an image formation area of each of the light modulators 400R, 400G, and 400B.

The polarization conversion element 140 aligns the polarization directions of the randomly polarized light fluxes having exited out of the second lens array 130 with one another to form polarized light of roughly one type useable by the light modulators 400R, 400G, and 400B.

The color separation/light guide system 200 includes dichroic mirrors 210 and 220, reflection mirrors 230, 240, and 250, and relay lenses 260 and 270. The color separation/light guide system 200 separates the white light W outputted from the illuminator 100 into red light R, green light G, and blue light B and guides the red light R, the green light G, and the blue light B to the corresponding light modulators 400R, 400G, and 400B, respectively. Field lenses 300R, 300G, and 300B are disposed between the color separation/light guide system 200 and the light modulators 400R, 400G, 400B.

The light modulators 400R, 400G, and 400B each include, although not shown in detail, a transmissive liquid crystal panel, and a light-incident-side polarizer and a light-exiting-side polarizer disposed on the light incident side and the light exiting side of the liquid crystal panel. The light modulators 400R, 400G, and 400B each modulate color light incident thereon in accordance with image information to form an image corresponding to the color light.

The cross dichroic prism 500 is formed by bonding four rectangular prisms to each other and therefore has a roughly square shape in a plan view, and dielectric multilayer films are formed along the roughly X-letter-shaped interfaces between the bonded rectangular prisms. The cross dichroic prism 500 combines the color image light fluxes outputted from the light modulators 400R, 400G, and 400B with one another.

The projection optical apparatus 600 includes a plurality of lenses (not shown), enlarges the combined image light from the cross dichroic prism 500, and projects the enlarged image light in the form of a color image on a projection surface SCR.

Configuration of Wavelength Conversion Element

The wavelength conversion element 40 will now be described in detail.

Figure 2:
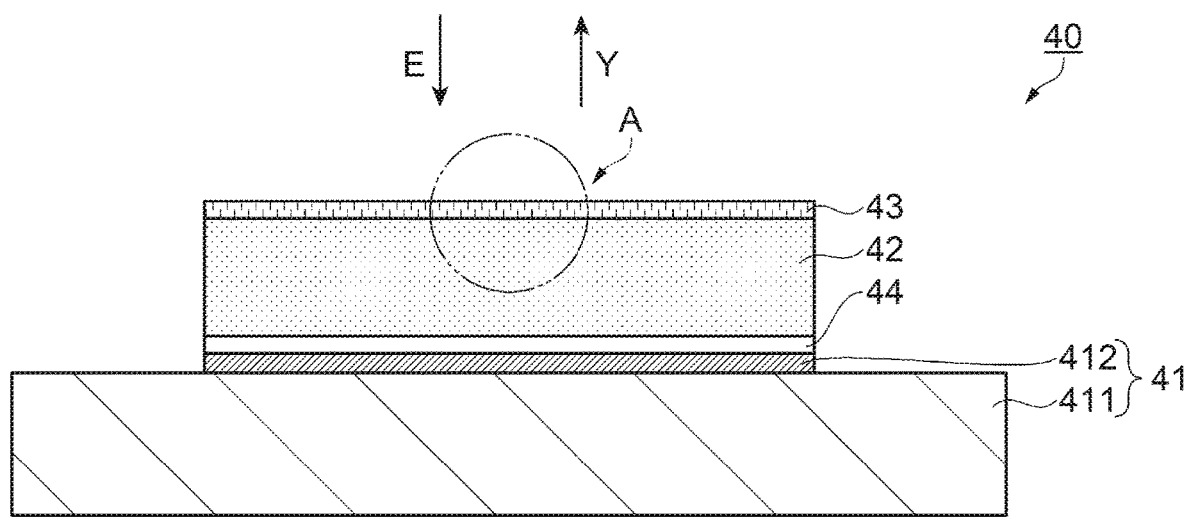
FIG. 2 diagrammatically shows a cross section of a wavelength conversion element in the first embodiment.

FIG. 2 diagrammatically shows a cross section of the wavelength conversion element 40.

The wavelength conversion element 40 includes the filter 43 and an adhesive layer 44 in addition to the base 41 and the phosphor layer 42, as shown in FIG. 2.

The base 41 includes a substrate 411 made of a metal, such as copper and aluminum, which has high thermal conductivity, and a reflection layer 412 provided on the substrate 411. The reflection layer 412 can be a silver enhanced reflection mirror, a dielectric mirror, or any other mirror having high reflectance. The substrate 411 is not necessarily made of a metal and can be made, for example, of a ceramic material or any other inorganic material.

The phosphor layer 42 is made of a material containing $(Y, Gd)_3(Al, Ga)_5O_{12}$: Ce, which is a YAG-based phosphor, with the Ce ion serving as the light emission center. The phosphor layer 42 is provided on the reflection layer 412 via the adhesive layer 44 made, for example, of a silicone resin. In the phosphor layer 42, the phosphor therein is excited by the excitation light E and emits the fluorescence Y containing red light and green light.

Figure 3:
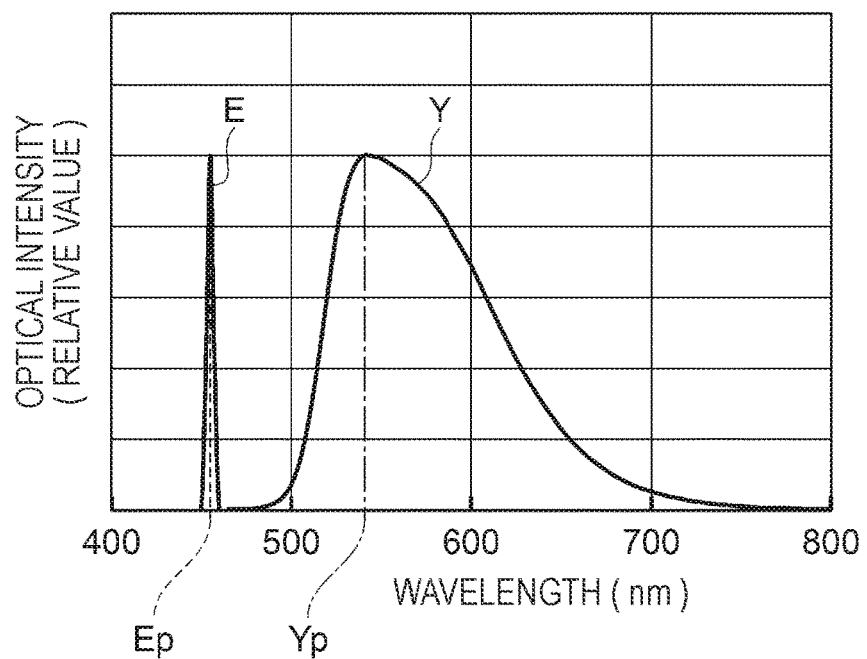
FIG. 3 is a graph showing relative optical intensity distributions of excitation light and fluorescence in the first embodiment.

FIG. 3 is a graph showing relative optical intensity distributions (emission spectra) of the excitation light E and the fluorescence Y. The phosphor layer 42 in the present embodiment is excited by the excitation light E having a peak wavelength Ep of about 455 nm and emits the fluorescence Y having a peak wavelength Yp of about 540 nm. Specifically, the fluorescence Y is light that belongs to a wavelength region ranging from about 500 to 690 nm and contains highly visible green light and highly visible red light. The phosphor layer 42 is not necessarily made of a material containing a Ce ion and may instead be formed of a material containing a rare earth ion, such as Eu, Nd, and Yb.

The filter 43 (see FIG. 2) is formed, for example, of a dielectric thin film made, for example, of $MgF_2$ and provided on a side of the phosphor layer 42 that is the side facing the collimation/light collection system 90, that is, a side of the phosphor layer 42 that is the side opposite the base 41.

The filter 43 transmits the excitation light E guided by the collimation/light collection system 90 and further transmits the fluorescence Y emitted from the phosphor layer 42. The filter 43 is further configured to reflect part of the excitation light E and the fluorescence Y incident on the filter 43 at a large angle of incidence.

Figure 4:
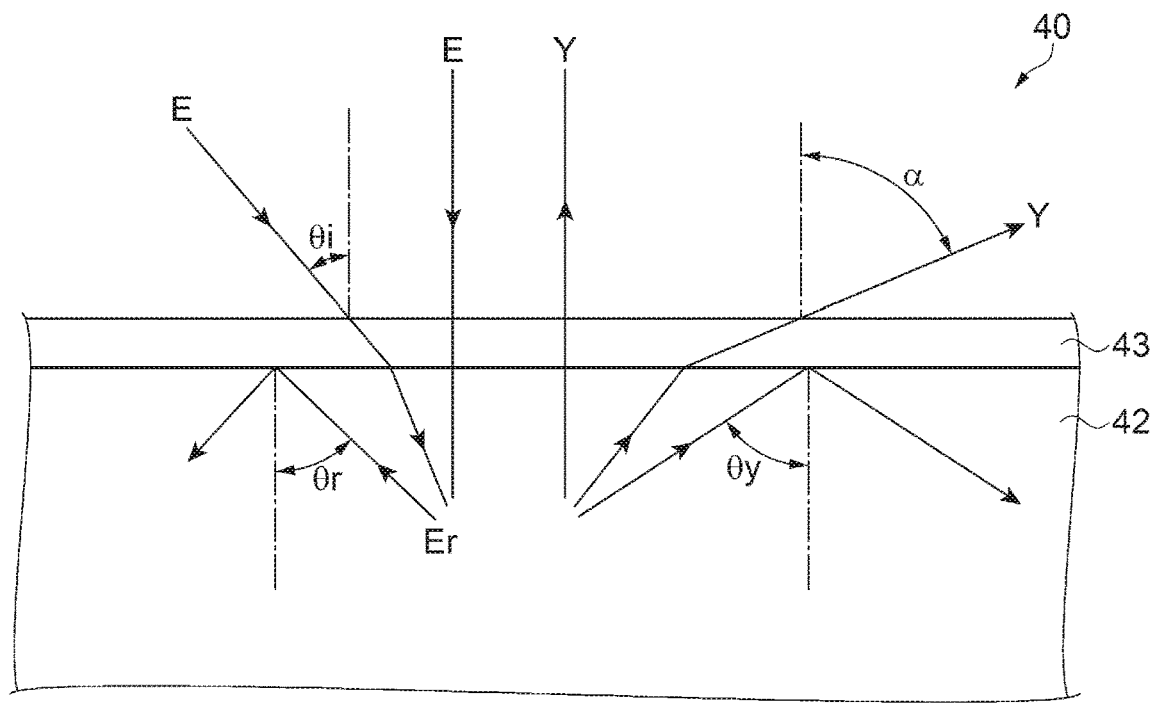
FIG. 4 is a diagrammatic view for describing how the excitation light and the fluorescence behave when they are incident on a filter in the first embodiment.

FIG. 4 is a diagrammatic view for describing how the excitation light E and the fluorescence Y behave when they are incident on the filter 43 and is an enlarged view of the portion A in FIG. 2.

The excitation light E guided by the collimation/light collection system 90 is incident on the filter 43 at an angle of incidence θi, including the excitation light E incident on the filter 43 at right angles, as shown in FIG. 4.

Figure 5:
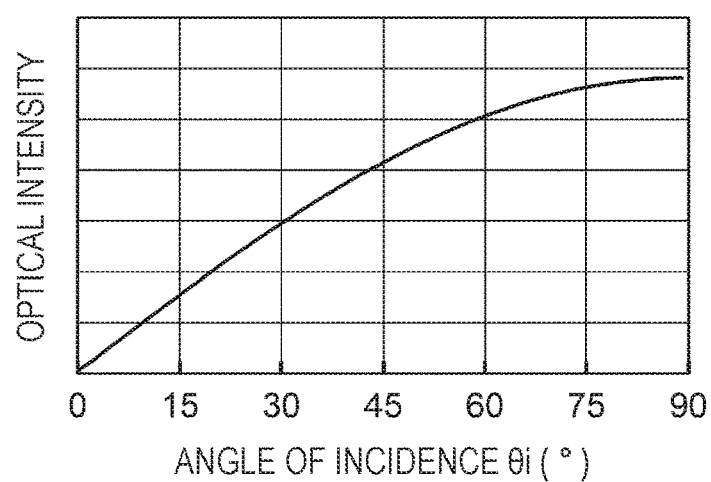
FIG. 5 is a graph showing the relationship between the angle of incidence and the optical intensity of the excitation light incident on the filter in the first embodiment.

FIG. 5 is a graph showing the relationship between the angle of incidence θi and optical intensity of the excitation light E incident on the filter 43 from the side facing the collimation/light collection system 90.

The optical intensity of the excitation light E incident on the filter 43 increases, as the angle of incidence θi (see FIG. 4) increases from 0°, and is gradually saturated beyond an angle of incidence θi of about 45°, as shown in FIG. 5.

Referring back to FIG. 4, part of the excitation light E having passed through the filter 43 and having been incident on the phosphor layer 42, is scattered in the phosphor layer 42, is reflected off the reflection layer 412 (see FIG. 2), and then travels toward the filter 43. The excitation light E traveling from the phosphor layer 42 toward the filter 43 is called excitation light Er, and let θr be the angle of incidence of the excitation light Er incident on the filter 43. Further, let θy be the angle of incidence of the fluorescence Y that travels from the phosphor layer 42 toward the filter 43 and is incident on the filter 43.

The filter 43 reflects the excitation light Er incident thereon at a large angle of incidence θr, as shown in FIG. 4, and the reflected excitation light Er contributes to generation of the fluorescence Y.

The filter 43 is so formed as to transmit the fluorescence Y emitted from the phosphor layer 42 but have high reflectance of the fluorescence Y incident on the filter 43 at a large angle of incidence θy, as shown in FIG. 4. Part of the fluorescence Y reflected off the filter 43 is therefore repeatedly scattered in the phosphor layer 42 and reflected off the reflection layer 412, and the resultant fluorescence Y is incident on the filter 43 at a smaller angle of incidence and therefore passes through the filter 43. That is, the spread of the fluorescence Y that exits out of the filter 43 (wavelength conversion element 40) is suppressed, and the light flux density of the fluorescence Y increases.

The filter 43 is so formed that the angle of emergence α of the fluorescence Y (angle with respect to normal to filter 43 and angle at which fluorescence Y exits, see FIG. 4) within a range where the light flux density thereof is high is equal to or slightly smaller than the acceptance angle of the collimation/light collection system 90. The acceptance angle of the collimation/light collection system 90 is the angle of light incident on the collimation/light collection system 90 and allowed to be optically taken into the collimation/light collection system 90 (angle with respect to optical axis of collimation/light collection system 90). The filter 43 in the present embodiment is so formed that the angle of emergence α is about 70°.

As described above, the filter 43 is so formed that the excitation light E is effectively used and the light flux density of the fluorescence Y that exits out of the filter at an angle of emergence smaller than or equal to α increases.

A description will now be made of results of a simulation conducted to specifically design the filter 43.

The simulation was conducted by using a single-layer film made of $MgF_2$, and the spectral characteristic of the filter 43 was simulated by changing the thickness of the $MgF_2$ film, which is prone to vary. A condition of the thickness of the $MgF_2$ film usable as the filter 43 was thus derived.

Figure 6:
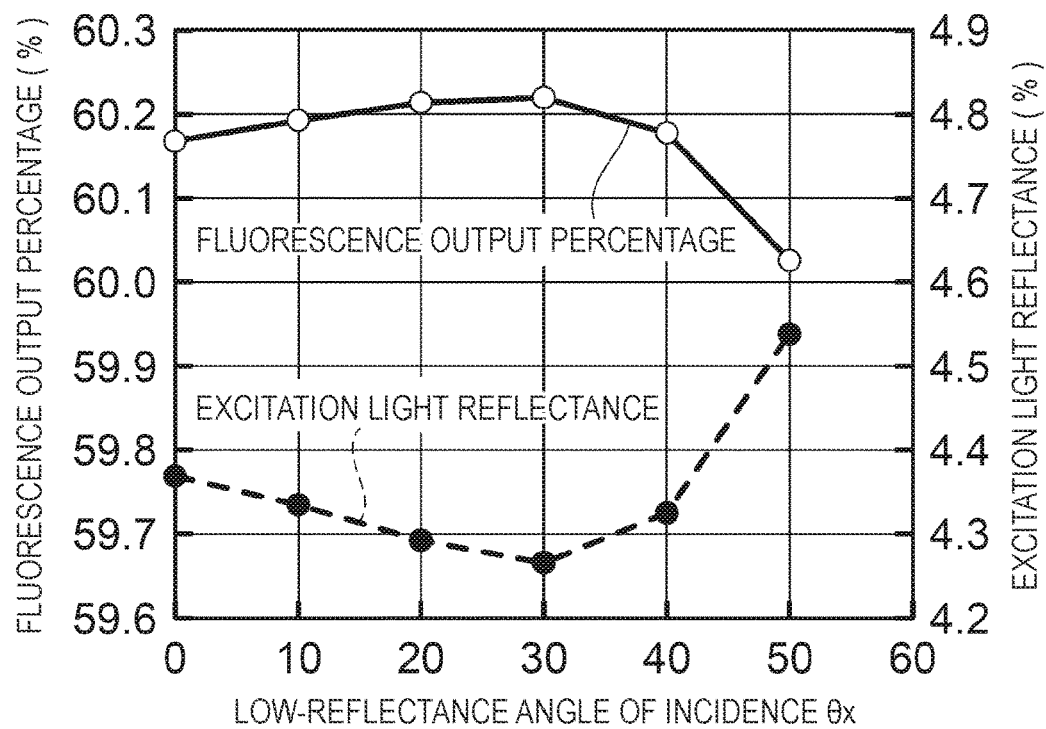
FIG. 6 shows graphs illustrating results of a simulation for designing the filter in the first embodiment.
Figure 7:
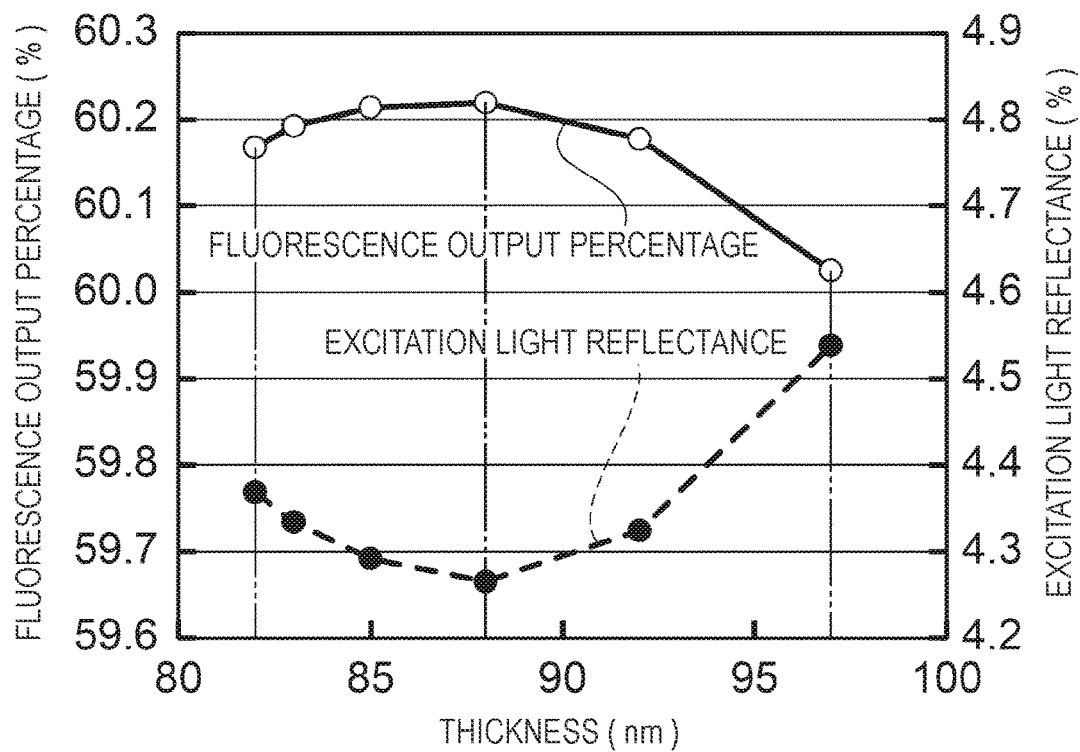
FIG. 7 shows graphs illustrating results of the simulation for designing the filter in the first embodiment.

FIGS. 6 and 7 show graphs illustrating results of the simulation for designing the filter 43. Specifically, FIG. 6 shows graphs illustrating the relationship of the angle of incidence of the excitation light E that causes the reflectance of the excitation light E to be minimized with the thickness of the $MgF_2$ film changed (called low-reflectance angle of incidence θx) with the reflectance of the excitation light E (excitation light reflectance) and the extraction percentage of the fluorescence Y (fluorescence output percentage) over a wavelength region ranging from 400 to 800 nm. FIG. 7 shows graphs illustrating the relationship of the excitation light reflectance and the fluorescence output percentage with the thickness of the $MgF_2$ film.

In the conducted simulation, the excitation light reflectance is minimized (about 4.25%) and the fluorescence output percentage is maximized (about 60.22%) when the low-reflectance angle of incidence θx is about 30°, as shown in FIG. 6. The thickness of the $MgF_2$ film in the case where the low-reflectance angle of incidence θx is 30° is about 88 nm, as shown in FIG. 7, and the $MgF_2$ film having this thickness can be used as the filter 43.

Figure 8:
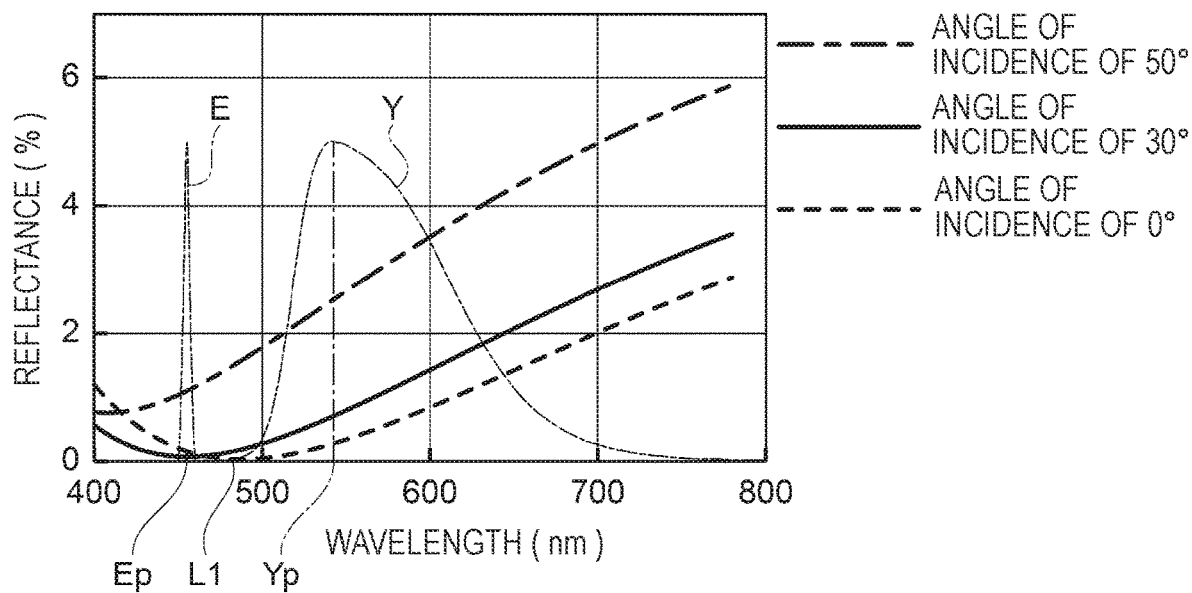
FIG. 8 shows graphs illustrating the spectral characteristic of an example of the filter in the first embodiment.

FIG. 8 shows graphs illustrating the spectral characteristic of the $MgF_2$ film having the thickness of 88 nm as an example of the filter 43. Specifically, FIG. 8 shows the relationship between the light incident on the filter 43 at angles of incidence θi (see FIG. 4) of 0°, 30°, and 50° and the reflectance provided by the filter 43 over the wavelength region from 400 to 800 nm. To clarify the relationship between the excitation light E and the fluorescence Y, FIG. 8 additionally shows a graph representing the relative optical intensity distributions of the excitation light E and the fluorescence Y.

The filter 43 has a spectral characteristic showing that the reflectance of the light that belongs to the wavelength region from the wavelength of the excitation light E to the wavelengths of the fluorescence Y (about 440 to about 690 nm) and is incident on the filter 43 at the angle of incidence of 0° (light incident at right angles) is minimized at a first wavelength L1, as shown in FIG. 8. The first wavelength L1 is located between the peak wavelength Ep of the excitation light E and the peak wavelength Yp of the fluorescence Y and is about 490 nm in the present embodiment. In other words, the filter 43 has a V-letter-shaped spectral characteristic showing that the reflectance of the light incident on the filter 43 at right angles at each of the peak wavelengths Ep and Yp on both sides of the first wavelength L1 is higher than the reflectance at the first wavelength L1.

The filter 43 further has a spectral characteristic showing that the reflectance of the light that belongs to the wavelength region from the wavelength of the excitation light E to the wavelengths of the fluorescence Y and incident on the filter 43 at the angle of incidence of 30° is minimized at the peak wavelength Ep of the excitation light E. As for the reflectance provided by the filter 43 at the peak wavelength Ep, the reflectance of the light incident on the filter 43 at the angle of incidence of 30° is lower than the reflectance of the light incident at the angle of incidence of 0°. In the wavelength region from the wavelength of the excitation light E to the wavelength of the fluorescence Y, the reflectance at the peak wavelength Ep is minimized (30° in present embodiment) corresponds to a first angle of incidence. The first angle of incidence is not limited to the angle of incidence of 30°.

The filter 43 is characterized in that the spectral characteristic is shifted toward the shorter wavelength side as the angle of incidence of the light incident on the filter 43 increases (shift characteristic). That is, the filter 43 is characterized in that the reflectance of the fluorescence Y increases as the angle of incidence thereof increases.

Figure 9:
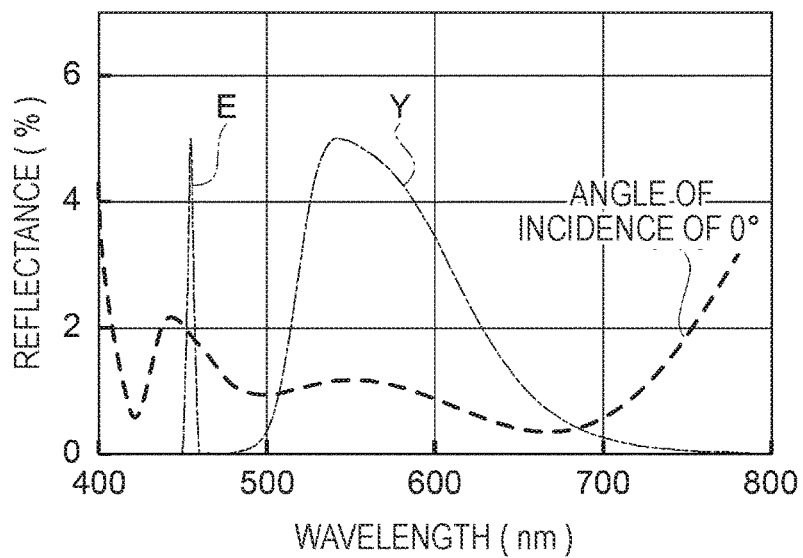
FIG. 9 shows a graph compared with that in FIG. 8 and illustrating an example of the spectral characteristic of an antireflection film of related art.

FIG. 9 shows a graph compared with that in FIG. 8 and illustrating an example of the spectral characteristic of an antireflection film of related art (antireflection film 810 (not shown)) and shows the relationship between the light incident on the antireflection film at the angle of incidence of 0° and the reflectance provided by the antireflection film 810. Although not shown, the antireflectance film 810 also has the shift characteristic.

The filter 43 is characterized in that the reflectance of the excitation light E is low (transmittance thereof is high) and the reflectance of the fluorescence Y on the longer wavelength side in the wavelength band to which the fluorescence Y belongs is high, as compared with the characteristic of the antireflection film 810, as shown in FIGS. 8 and 9.

Figure 10:
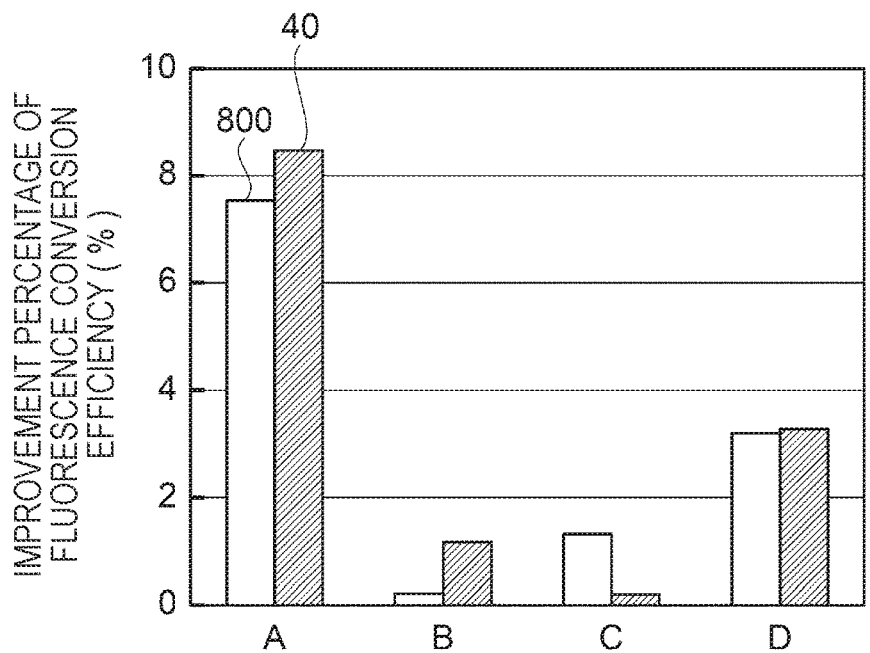
FIG. 10 shows graphs for comparing the characteristic of the wavelength conversion element in the first embodiment with the characteristic of a wavelength conversion element including the antireflection film of related art.

FIG. 10 shows graphs for comparing the characteristic of the wavelength conversion element 40 in the present embodiment with the characteristic of a wavelength conversion element 800 including the antireflection film 810 of related art (not shown). Specifically, FIG. 10 shows graphs illustrating the percentage of improvement in conversion efficiency of the wavelength conversion elements 40 and 800 into the fluorescence Y with respect to a wavelength conversion element having no filter 43 or antireflection film 810 (not shown).

The comparison in FIG. 10 is performed based on the following four factors A to D. The factor A relates to transmission of the excitation light E incident at angles of incidence smaller than or equal to 45°. The factor B relates to reflection of the excitation light E incident at angles of incidence greater than 45°. The factor C relates to transmission of the fluorescence Y incident at angles of incidence smaller than or equal to 70°. The factor D relates to reflection of the fluorescence Y incident at angles of incidence greater than 70°. The angle of 45° is derived from the optical intensity of the excitation light E described above (see FIG. 5), and the angle of 70° is derived from the angle of emergency α in the present embodiment described above (see FIG. 4).

The improvement percentage provided by the wavelength conversion element 40 is higher than that provided by the wavelength conversion element 800 in terms of the factors A and B, as shown in FIG. 10. A conceivable reason for this is that the filter 43 transmits the excitation light E incident at the angles of incidence smaller than or equal to 45° by a greater amount than the antireflection film 810 and the filter 43 reflects the excitation light Er (see FIG. 4) incident at angles of incidence θr greater than 45° by a greater amount than the antireflection film 810 so that the excitation light E is effectively used by the filter 43.

On the other hand, in terms of the factor C, the improvement percentage provided by the wavelength conversion element 40 is lower than the improvement percentage provided by the wavelength conversion element 800. The reason for this is that the filter 43 is so formed that the reflectance of the fluorescence Y increases (transmittance thereof decreases) as the angle of incidence thereof increases. In terms of the factor D, the improvement percentage provided by the wavelength conversion element 40 is equal to the improvement percentage provided by the wavelength conversion element 800.

The overall improvement percentage provided by the wavelength conversion element 40 including the factors A to D is higher than that provided by the wavelength conversion element 800. In terms of fluorescence output percentage, the wavelength conversion element 40 provides 60.22%, which is greater than 59.46% provided by the wavelength conversion element 800.

As described above, the filter 43 is configured to effectively use the excitation light E and suppress the spread of the fluorescence Y that exists out of the filter 43 (wavelength conversion element 40).

The filter 43 is the single-layer $MgF_2$ film by way of example, but not necessarily, and can be any of a thin film having the characteristics described above, such as a thin film made of a different material or a thin film formed of a plurality of dielectric multilayer films or any other thin films layered on each other.

As described above, the present embodiment can provide the following effects.

(1) The wavelength conversion element 40, which includes the filter 43 described above, can effectively use the excitation light E to increase the emission efficiency of the fluorescence Y and suppress the spread of the outputted fluorescence Y to output high-light-flux-density fluorescence Y.

(2) The filter 43 efficiently transmits the component that forms the excitation light E and is incident at the first angle of incidence (30° in present embodiment). The wavelength conversion element 40 provided in the present embodiment can therefore effectively use the excitation light E formed of the component incident at the first angle of incidence and therefore having high optical intensity to emit the fluorescence Y.

(3) The spread of the fluorescence Y outputted from the wavelength conversion element 40 is suppressed. Therefore, in the wavelength conversion system 30, the fluorescence Y emitted from the wavelength conversion element 40 can be efficiently taken into the collimation/light collection system 90, and the size of the collimation/light collection system 90 can be reduced. Further, the size of the first light source apparatus 101 can in turn be reduced.

(4) The first light source apparatus 101, which includes the wavelength conversion element 40, can efficiently use the excitation light E outputted from the light emitter 10 and suppress the spread of the fluorescence Y to output high-luminance fluorescence Y.

(5) The first light source apparatus 101, in which the light emitter 10 is formed of semiconductor lasers, can output the fluorescence Y for a long period.

(6) The projector 1, which includes the first light source apparatus 101 including the wavelength conversion element 40, can project a brighter image and can perform projection on a large projection surface under a brighter environment.

Second Embodiment

A wavelength conversion element 50 according to a second embodiment will be described below. In the following description, the same components as those in the first embodiment have the same reference characters, and detailed descriptions thereof will be omitted or simplified.

Figure 11:
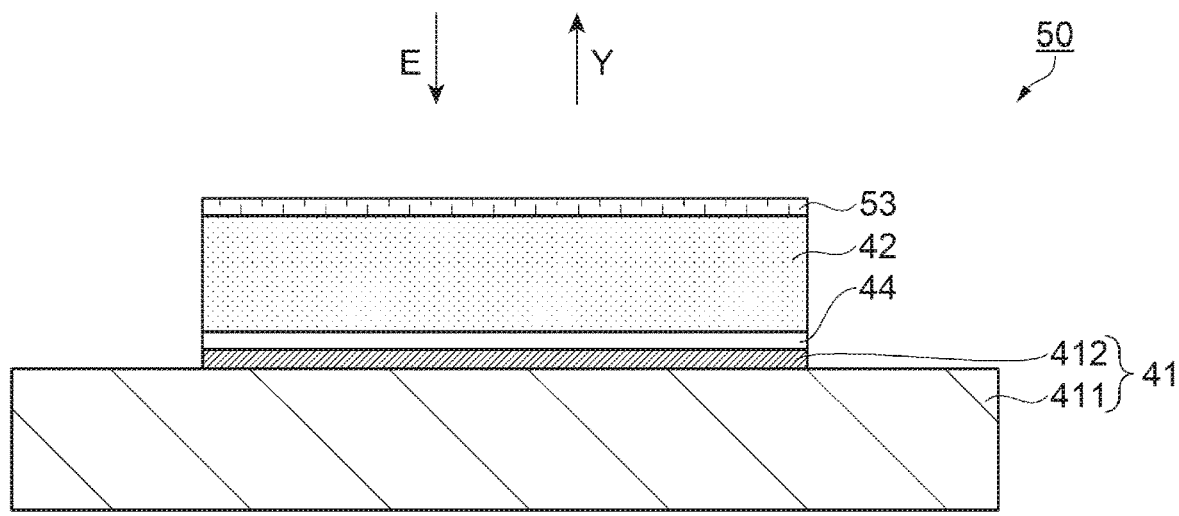
FIG. 11 diagrammatically shows a cross section of a wavelength conversion element in a second embodiment.

FIG. 11 diagrammatically shows a cross section of the wavelength conversion element 50.

The wavelength conversion element 50 in the present embodiment includes a filter 53, which differs from the filter 43 in the wavelength conversion element 40 according to the first embodiment.

The filter 53 is formed, for example, of a short wave pass (SWP) filter formed of a thin film made of a high-refractive-index material ($Nb_2O_5$, for example) and a thin film made of a low-refractive-index material ($SiO_2$, for example) alternately layered on each other.

Figure 12:
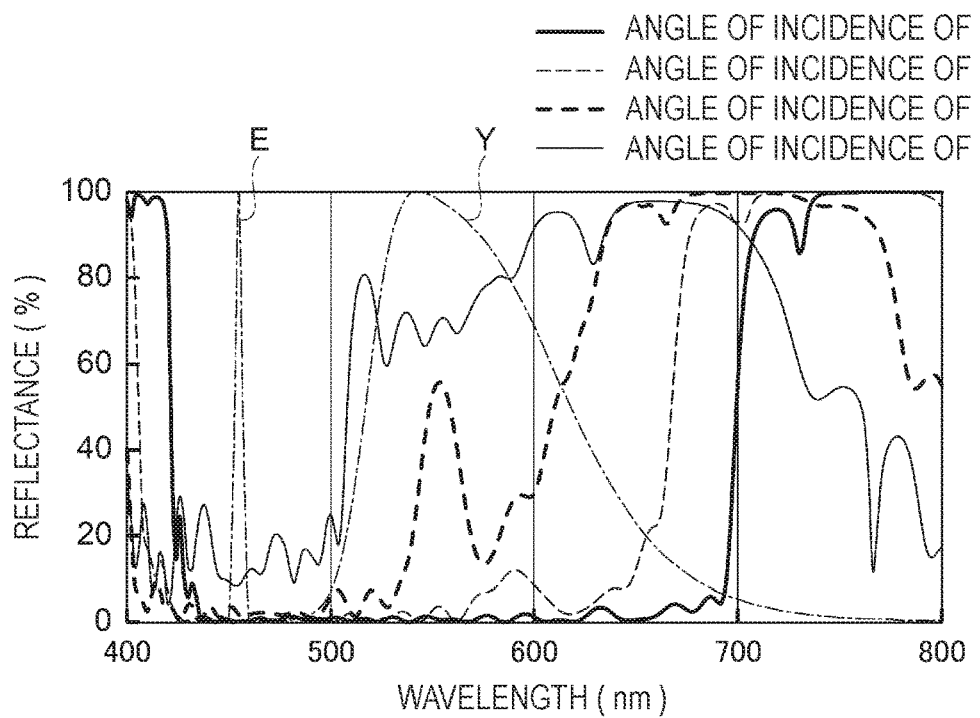
FIG. 12 shows graphs illustrating examples of the spectral characteristic of a filter in the second embodiment.

FIG. 12 shows graphs illustrating examples of the spectral characteristic of the filter 53 and shows results of a simulation of the filter 53 formed of 49 thin films made of a high-refractive-index material and 49 thin films made of a low-refractive-index material alternately layered on each other. Specifically, FIG. 12 shows the relationship between light incident on the filter 53 at angles of incidence of 0°, 30°, 50°, and 70° and the reflectance provided by the filter 53 over the wavelength region from 400 to 800 nm. FIG. 12 additionally shows a graph representing the relative optical intensity distributions of the excitation light E and the fluorescence Y.

The spectral characteristic of the filter 53 is expressed by steep curves as shown in FIG. 12, whereas the spectral characteristic of the filter 43 in the first embodiment is expressed by gentle curves. Further, the filter 53 has the shift characteristic, as does the filter 43 in the first embodiment.

Specifically, the filter 53 transmits the excitation light E incident at right angles (angle of incidence of 0°) and the fluorescence Y incident at right angles. Further, the filter 53 reflects at least part of red light incident at right angles and having low visibility (light having wavelengths longer than or equal to about 700 nm). The filter 53 therefore has a spectral characteristic showing that the filter 53 transmits red light having high visibility (light having wavelengths shorter than about 700 nm) and incident at right angles and reflects part of red light having low visibility and incident at right angles or a spectral characteristic showing that transmission is switched to reflection or vice versa in a narrow wavelength band.

The filter 53 reflects light having wavelengths shorter than 700 nm as the angle of incidence of the light increases. The filter 53 transmits the excitation light E incident at an angle of incidence of about 70° in such a way that the optical intensity of the transmitted excitation light E is higher than the optical intensity of the reflected excitation light and reflects the fluorescence Y incident at an angle of incidence of about 70° in such a way that the optical intensity of the reflected fluorescence Y is higher than the optical intensity of the transmitted fluorescence Y. The angle of incidence of the fluorescence Y reflected in such a way that the optical intensity of the reflected fluorescence Y is higher than the optical intensity of the transmitted fluorescence Y corresponds to a second angle of incidence. That is, the second angle of incidence in the present embodiment is greater than 50° including 70°, as shown in FIG. 12.

Figure 13:
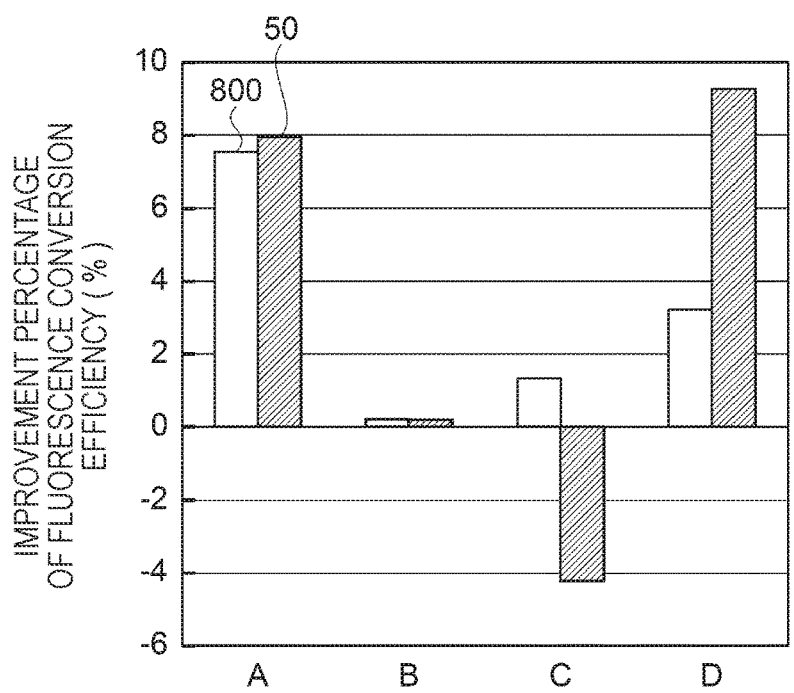
FIG. 13 shows graphs for comparing the characteristic of the wavelength conversion element in the second embodiment with the characteristic of the wavelength conversion element of related art.

FIG. 13 shows graphs for comparing the characteristic of the wavelength conversion element 50 in the present embodiment with the characteristic of the wavelength conversion element 800 of related art (not shown), and the comparison is performed based on the four factors A to D, as in the first embodiment.

The improvement percentage provided by the wavelength conversion element 50 is higher than that provided by the wavelength conversion element 800 in terms of the factor A, as shown in FIG. 13. A conceivable reason for this is that the filter 53 transmits the excitation light E incident at the angles of incidence smaller than or equal to 45° by a greater amount than the antireflection film 810 so that the excitation light E is effectively used by the filter 53. In terms of the factor B, the improvement percentage provided by the wavelength conversion element 50 is equal to the improvement percentage provided by the wavelength conversion element 800.

On the other hand, in terms of the factor C, the improvement percentage provided by the wavelength conversion element 50 is lower than the improvement percentage provided by the wavelength conversion element 800. The reason for this is that the filter 53 is so formed that the reflectance of the fluorescence Y increases (transmittance thereof decreases) as the angle of incidence thereof increases.

In terms of the factor D, the improvement percentage provided by the wavelength conversion element 50 is higher than the improvement percentage provided by the wavelength conversion element 800 and is much greater than the decrease in the improvement percentage in terms of the factor C. A conceivable reason for this is that the filter 53 reflects the fluorescence Y incident at the angles of incidence θy (see FIG. 4) greater than 70° by a greater amount than the antireflection film 810 so that the fluorescence Y is efficiently outputted at an angle of emergence smaller than or equal to α.

The overall improvement percentage provided by the wavelength conversion element 50 including the factors A to D is higher than that provided by the wavelength conversion element 800. In terms of fluorescence output percentage, the wavelength conversion element 50 provides 61.04%, which is greater than 59.46% provided by the wavelength conversion element 800.

The thus configured filter 53 effectively uses particularly the fluorescence Y incident at a large angle of incidence (factor D) to increase the fluorescence output percentage.

The filter 53 is the thin film formed of 49 thin films made of a high-refractive-index material and 49 thin films made of a low-refractive-index material alternately layered on each other by way of example. The filter 53 can instead be formed of any thin film formed in a different configuration but having the characteristic described above.

As described above, the present embodiment can provide the following effects.

The filter 53 has a spectral characteristic showing that transmission is switched to reflection or vice versa in a narrow wavelength band. The wavelength conversion element 50 provided in the present embodiment can therefore further effectively use the incident excitation light E to emit the fluorescence Y and suppress the spread of the emitted fluorescence Y to output higher-light-flux-density fluorescence Y.

Third Embodiment

A projector 11 according to a third embodiment will be described below with reference to the drawings. In the following description, the same components as those in the first embodiment have the same reference characters, and detailed descriptions thereof will be omitted or simplified.

Figure 14:
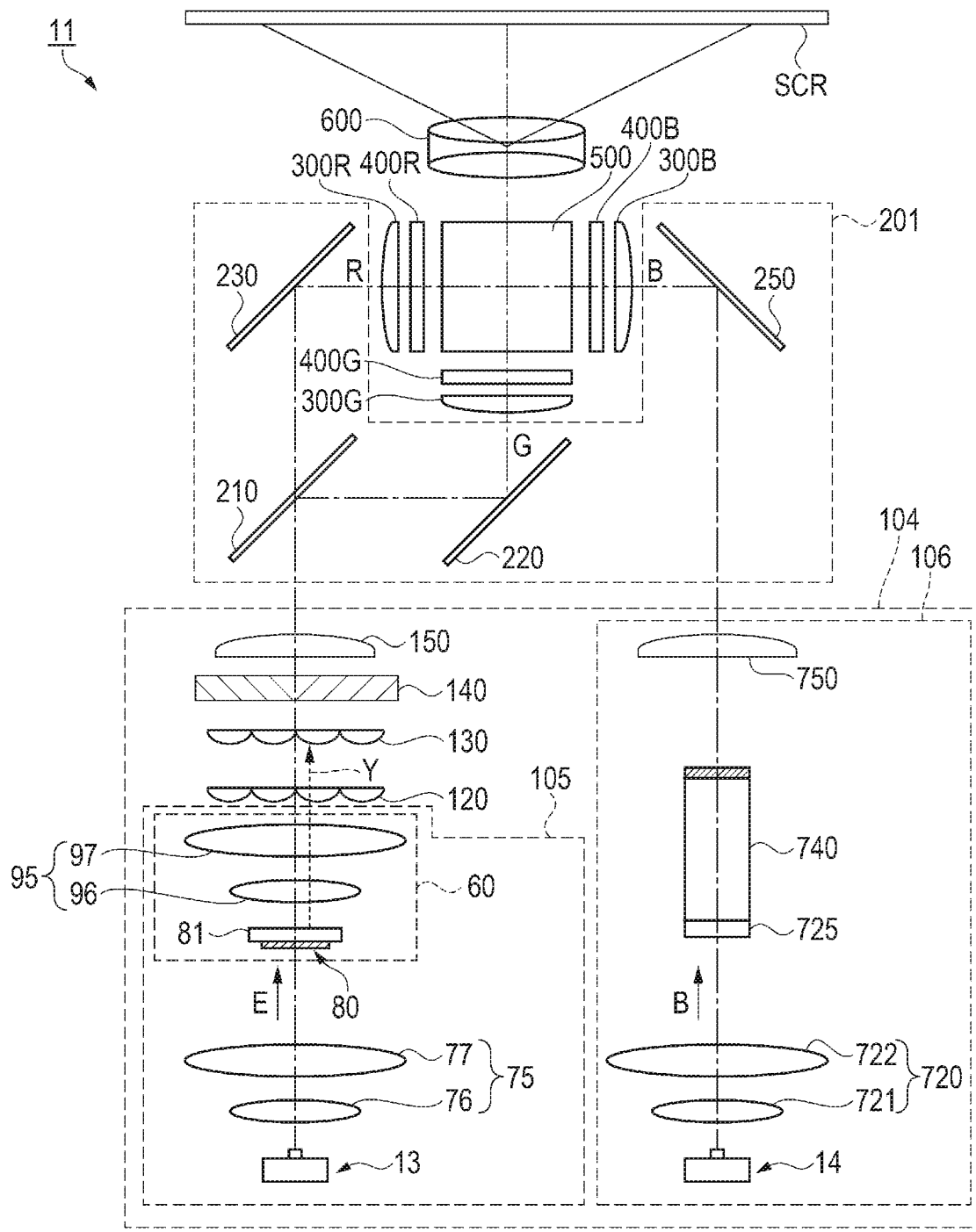
FIG. 14 is a diagrammatic view showing the optical system of a projector according to a third embodiment.

FIG. 14 is a diagrammatic view showing the optical system of the projector 11 according to the present embodiment.

The projector 11 according to the present embodiment includes an illuminator 104 and a color separation/light guide system 201, which differ from the illuminator 100 and the color separation/light guide system. 200 (see FIG. 1) provided in the projector 1 according to the first embodiment, as shown in FIG. 14.

The illuminator 104 includes not only a first light source apparatus 105, which outputs the fluorescence Y, and a second light source apparatus 106, which outputs the blue light B, but the optical integration system (lens arrays 120 and 130 and superimposing lens 150) and the polarization conversion element 140. The illuminator 104 is so configured that the fluorescence Y outputted from the first light source apparatus 105 travels through the optical integration system and the polarization conversion element 140 to the color separation/light guide system 201 and the blue light B outputted from the second light source apparatus 106 travels to the color separation/light guide system 201 without traveling through the optical integration system or the polarization conversion element 140. That is, the color separation/light guide system 201 has a configuration that does not include the reflection mirror 240 or the relay lens 260 or 270 (see FIG. 1) provided in the color separation/light guide system 200 in the first embodiment, as shown in FIG. 14.

The first light source apparatus 105 includes a light emitter 13, a light collection system 75, and a wavelength conversion system 60.

The light emitter 13 is formed of one or more semiconductor lasers and outputs the excitation light E.

The light collection system 75 includes lenses 76 and 77, collects the excitation light E outputted from the light emitter 13, and directs the collected excitation light E to a phosphor layer 82, which will be described later. The light collection system 75 may instead include one lens or three or more lenses.

The wavelength conversion system 60 includes a wavelength conversion element 80 and a collimation system 95.

Figure 15:
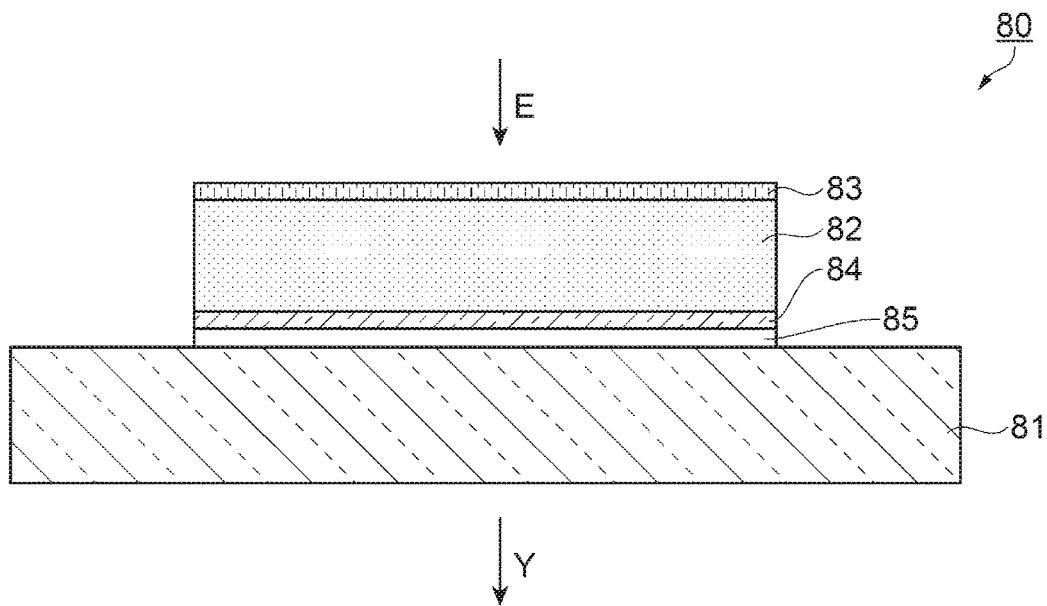
FIG. 15 diagrammatically shows a cross section of a wavelength conversion element in the third embodiment.

FIG. 15 diagrammatically shows a cross section of the wavelength conversion element 80.

The wavelength conversion element 80 includes a base 81, the phosphor layer 82, a first filter 83, a second filter 84, and an adhesive layer 85, as shown in FIG. 15.

The base 81 is made of a plate-shaped, light transmissive material, for example, quartz glass, crystal quartz, and sapphire.

The phosphor layer 82 is formed in the same manner in which the phosphor layer 42 in the first embodiment is formed and emits the fluorescence Y when excited by the excitation light E outputted from the light emitter 13.

The first filter 83 is provided on a side of the phosphor layer 82 that is the side on which the excitation light E is incident and transmits the excitation light E. The second filter 84 is provided on a side of the phosphor layer 82 that is the side opposite the first filter 83 and transmits the fluorescence Y. The first filter 83 is configured to reflect the excitation light E incident thereon at a large angle of incidence, and the second filter 84 is configured to reflect the fluorescence Y incident thereon at a large angle of incidence, as will be described later in detail.

The phosphor layer 82, on which the first filter 83 and the second filter 84 are provided, is bonded to the base 81 via the adhesive layer 85. Specifically, a side of the phosphor layer 82 that is the side facing the second filter 84 is bonded to the base 81. The adhesive layer 85 is made, for example, of a light transmissive resin. As described above, the wavelength conversion element 80 in the present embodiment is so configured that the first filter 83 is provided on a side of the phosphor layer 82 that is the side opposite the base 81 and the second filter 84 is provided between the phosphor layer 82 and the base 81.

The excitation light E guided by the light collection system 75 then passes through the first filter 83 and causes the phosphor layer 82 to produce the fluorescence Y. The fluorescence Y emitted from the phosphor layer 82 passes through the second filter 84, the adhesive layer 85, and the base 81 and travels toward the collimation system 95. As described above, the wavelength conversion element 80 is configured as a transmissive wavelength conversion element that emits the fluorescence Y toward the side opposite the side on which the excitation light E is incident.

Referring back to FIG. 14, the collimation system 95 includes lenses 96 and 97 and roughly parallelizes the fluorescence Y emitted from the wavelength conversion element 80. The collimation system 95 corresponds to a pickup system that the fluorescence Y emitted from the wavelength conversion element 80 enters. The collimation system 95 may instead include one lens or three or more lenses.

The fluorescence Y roughly parallelized by the collimation system 95 travels through the lens arrays 120 and 130, the polarization conversion element 140, and the superimposing lens 150 and enters the color separation/light guide system 201. The fluorescence Y having entered the color separation/light guide system 201 is separated into the red light R and the green light G, which are guided to the light modulators 400R and 400G, respectively.

The second light source apparatus 106 includes a light emitter 14, a light collection system 720, a scatter plate 725, a polarization conversion integrator rod 740, and a light collection lens 750, as shown in FIG. 14.

The light emitter 14 is formed of one or more semiconductor lasers and outputs the blue light B.

The light collection system 720 includes lenses 721 and 722 and guides the blue light B outputted from the light emitter 14 to the scatter plate 725. The light collection system 720 may instead include one lens or three or more lenses.

The scatter plate 725 scatters the blue light B incident thereon in such a way that the scattered blue light B has a light orientation distribution similar to the light orientation distribution of the fluorescence Y outputted from the wavelength conversion element 80.

The polarization conversion integrator rod 740 homogenizes the in-plane optical intensity distribution of the blue light B scattered by the scatter plate 725 and converts the blue light B having various polarization directions into polarized light of roughly one type.

The light collection lens 750 collects the blue light B from the polarization conversion integrator rod 740. The blue light B collected by the light collection lens 750 is reflected off the reflection mirror 250 of the color separation/light guide system 201 and guided to the light modulator 400B.

First Filter and Second Filter

The first filter 83 and the second filter 84 in the wavelength conversion element 80 will now be described in detail.

The first filter 83 and the second filter 84 are each formed of a dichroic filter that reflects light having a specific wavelength and transmits light having the other wavelengths.

Figure 16:
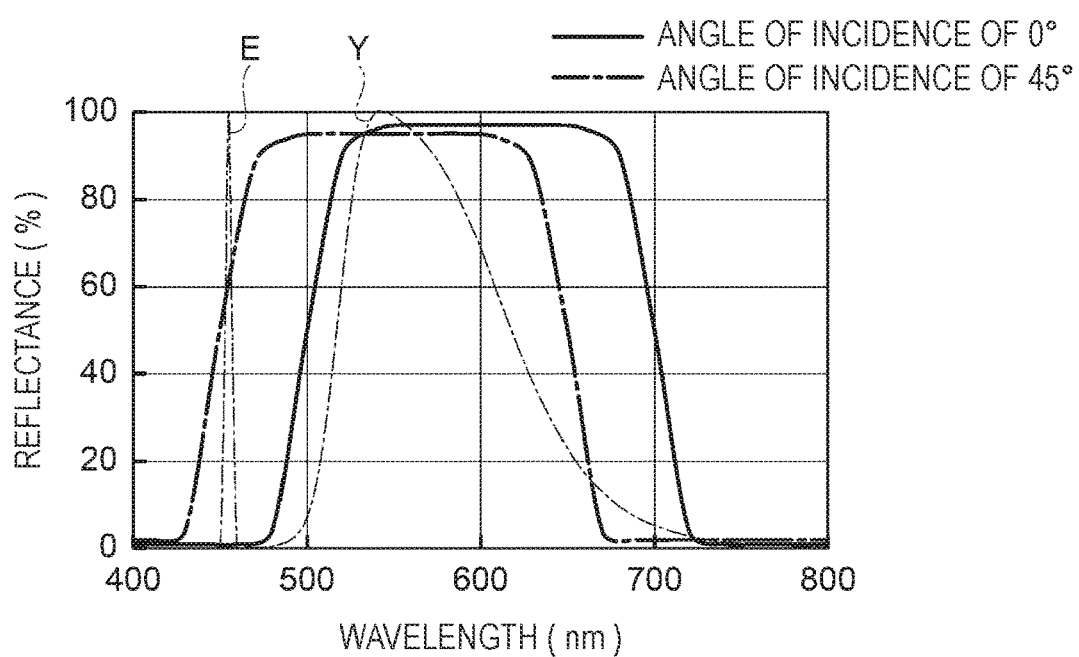
FIG. 16 shows graphs illustrating an overview of the spectral characteristic of a first filter in the third embodiment.

FIG. 16 shows graphs illustrating an overview of the spectral characteristic of the first filter 83 and shows the relationship between light that belongs to the wavelength region from 400 to 800 nm and is incident at angles of incidence of 0° and 45° and the reflectance provided by the first filter 83. FIG. 16 additionally shows a graph representing the relative optical intensity distributions of the excitation light E and the fluorescence Y.

The first filter 83 transmits the excitation light E incident at right angles (angle of incidence of 0°) and light incident at right angles and having wavelengths longer than 700 nm and reflects the fluorescence Y incident at right angles over the wavelength region from 400 to 800 nm, as shown in FIG. 16. That is, the first filter 83 has the function of transmitting the excitation light E incident on the wavelength conversion element 80 and reflecting the fluorescence Y emitted from the phosphor layer 82 and directed toward the first filter 83. The fluorescence Y emitted from the phosphor layer 82 can thus be efficiently outputted toward the light exiting side of the wavelength conversion element 80.

The first filter 83 has the shift characteristic. That is, the spectral characteristic of the first filter 83 is shifted toward the shorter wavelength side as the angle of incidence of the incident light increases, and the reflectance of the excitation light E gradually increases in addition to the reflection of the fluorescence Y. The first filter 83 reflects the excitation light E incident at the angle of incidence of about 45° in such a way that the optical intensity of the reflected excitation light E is higher than the optical intensity of the transmitted excitation light E. The angle of incidence of the excitation light E reflected off the first filter 83 in such a way that the optical intensity of the reflected excitation light E is higher than the optical intensity of the transmitted excitation light E corresponds to a third angle of incidence. That is, the third angle of incidence in the present embodiment is greater than about 45°. The third angle of incidence is not limited to about 45°.

As described above, since the first filter 83 reflects part of the excitation light E incident at the third angle of incidence, part of the excitation light E incident from the phosphor layer with no contribution to the fluorescence generation on the first filter at the third angle of incidence can be directed toward the phosphor layer again to contribute to the generation of the fluorescence Y.

Figure 17:
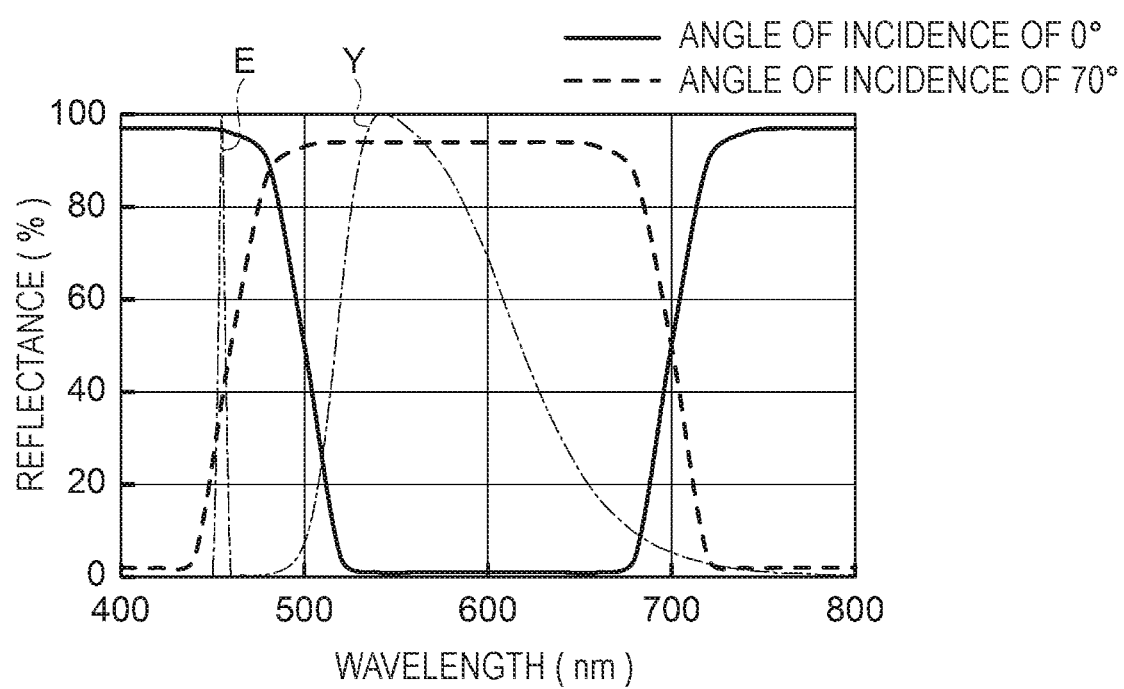
FIG. 17 shows graphs illustrating an overview of the spectral characteristic of a second filter in the third embodiment.

FIG. 17 shows graphs illustrating an overview of the spectral characteristic of the second filter 84 and shows the relationship between light that belongs to the wavelength region from 400 to 800 nm and is incident at angles of incidence of 0° and 70° and the reflectance provided by the second filter 84. FIG. 17 additionally shows the graph representing the relative optical intensity distributions of the excitation light E and the fluorescence Y, as in FIG. 16.

The second filter 84 reflects the excitation light E incident at right angles (angle of incidence of 0°) and light incident at right angles and having wavelengths longer than 700 nm and transmits the fluorescence Y incident at right angles, as shown in FIG. 17. That is, the second filter 84 has the function of transmitting the fluorescence Y emitted from the phosphor layer 82 and reflecting the excitation light E directed toward the second filter 84. As a result, the excitation light E having passed through the first filter 83 and the phosphor layer 82 is directed toward the phosphor layer 82 again for an increase in the efficiency of conversion into the fluorescence Y.

The second filter 84 has the shift characteristic, as does the first filter 83, and the reflectance of the fluorescence Y increases as the angle of incidence thereof increases. The second filter 84 reflects the fluorescence Y incident at a certain angle of incidence or greater in such away that the optical intensity of the reflected fluorescence Y is higher than the optical intensity of the transmitted fluorescence Y. The second filter 84 transmits part of the excitation light E incident at an angle of incidence of about 70° and reflects roughly the fluorescence Y incident at an angle of incidence of about 70°, as shown in FIG. 17. That is, although not shown in FIG. 17, the angle of incidence (fourth angle of incidence) of the fluorescence Y incident on and reflected off the second filter 84 in such a way that the optical intensity of the reflected fluorescence Y is higher than the optical intensity of the transmitted fluorescence Y is greater than or equal to an angle smaller than 70°.

As described above, since the second filter 84 reflects part of the fluorescence Y incident at the fourth angle of incidence, the spread of the fluorescence Y due, for example, to the scattering in the phosphor layer 82 is suppressed, and high-light-flux-density fluorescence Y incident at angles smaller than or equal to the fourth angle of incidence is outputted from the wavelength conversion element 80.

The second filter 84 has the spectral characteristic showing that it transmits part of the excitation light E incident at a large angle of incidence. The second filter 84 can instead be configured not to substantially reflect the excitation light E, for example, by increasing the thickness of the phosphor layer 82 or increasing the concentration of Ce to allow the excitation light E incident via the first filter 83 on the phosphor layer 82 to be roughly entirely used to generate the fluorescence Y before the excitation light E reaches the second filter 84.

As described above, the present embodiment can provide the following effects.

(1) The wavelength conversion element 80, in which the first filter 83 reflects the fluorescence Y, can efficiently output the fluorescence Y toward the light exiting side.

(2) The wavelength conversion element 80, in which the second filter 84 reflects the excitation light E, can cause the excitation light E having passed through the first filter 83 and the phosphor layer 82 to be directed toward the phosphor layer 82 again for an increase in the efficiency of the conversion into the fluorescence Y.

(3) The first filter 83 reflects the excitation light E incident at the third angle of incidence in such a way that the optical intensity of the reflected excitation light E is higher than the optical intensity of the transmitted excitation light E. The wavelength conversion element 80 provided in the present embodiment can therefore convert the excitation light E into the fluorescence Y with higher efficiency.

(4) The second filter 84 reflects the fluorescence incident at the fourth angle of incidence in such a way that the optical intensity of the reflected fluorescence is higher than the optical intensity of the transmitted fluorescence. The wavelength conversion element 80 provided in the present embodiment can therefore output high-light-flux-density fluorescence Y with the spread thereof suppressed.

The invention is not limited to the embodiments described above, and a variety of changes and improvements can be made to the embodiments described above. Variations will be described below.

The wavelength conversion elements 40 and 50 in the first and second embodiments each have a stationary structure. Instead, a wavelength conversion element including a phosphor layer provided in a ring-like shape on the base may be formed, a filter having the characteristic of the filter 43 or 53 described above may be provided on the phosphor layer, and the thus configured wavelength conversion element may have a rotary structure rotated, for example, with a motor. The rotary structure increases the heat dissipation capability of the wavelength conversion element 40 or 50.

Similarly, the wavelength conversion element 80 in the third embodiment has a stationary structure. Instead, a wavelength conversion element including a phosphor layer provided in a ring-like shape on the base may be formed, a first filter and a second filter having the characteristics of the first filter 83 and the second filter 84 described above may be provided on the phosphor layer, and the thus configured wavelength conversion element may be rotated, for example, with a motor.

The wavelength conversion element 80 in the third embodiment is so configured that the excitation light E is incident on a side of the phosphor layer 82 that is the side opposite the base 81. Instead, a wavelength conversion element may be so configured that the excitation light E is incident on a side of the phosphor layer 82 that is the side facing the base 81. In this configuration, the first filter 83 is provided between the base 81 and the phosphor layer 82, and the second filter 84 is provided on a side of the phosphor layer 82 that is the side opposite the base 81.

The projectors 1 and 11 each use transmissive liquid crystal panels as light modulators and may instead use reflective liquid crystal panels. Instead, as each of the light modulators, a micromirror-type light modulator, for example, a DMD (digital micromirror device) may be used.

The light modulators in each of the embodiments described above employ what is called a three-panel method using the three light modulators 400R, 400G, and 400B corresponding to the red light R, the green light G, and the blue light B, but not necessarily, and may employ a single-panel method. Instead, the invention is also applicable to a projector including two light modulators or four or more light modulators.

The entire disclosure of Japanese Patent Application No. 2017-164034, filed on Aug. 29, 2017 is expressly incorporated by reference herein.

What is claimed is:

1. A wavelength conversion element comprising:
a phosphor layer that emits fluorescence when excitation light is incident on the phosphor layer;
a base having a reflection layer; and
a filter provided on a side of the phosphor layer that is a side opposite the reflection layer,
wherein the filter is so configured that reflectance of light that belongs to a wavelength region from a wavelength of the excitation light to a wavelength of the fluorescence and is incident on the filter at a zero-degree incident angle is minimized at a first wavelength, and, while the reflectance is minimized at the first wavelength, the reflectance is larger than the minimized reflectance at a second wavelength that is smaller than the first wavelength and at a third wavelength that is larger than the first wavelength, and
the first wavelength is located between a peak wavelength of the excitation light and a peak wavelength of the fluorescence.

2. A wavelength conversion element according to claim 1, wherein the filter is so configured that the reflectance of light that belongs to the wavelength region and is incident at a first angle of incidence is minimized at the peak wavelength of the excitation light.

3. A wavelength conversion system comprising:
the wavelength conversion element according to claim 2; and
a pickup system on which the fluorescence emitted from the wavelength conversion element is incident.

4. A light source apparatus comprising:
a light emitter that outputs excitation light; and
the wavelength conversion element according to claim 2.

5. A projector comprising:
the light source apparatus according to claim 4;
a light modulator that modulates light outputted from the light source apparatus; and
a projection optical apparatus that projects the light modulated by the light modulator.

6. A wavelength conversion system comprising:
the wavelength conversion element according to claim 1; and
a pickup system on which the fluorescence emitted from the wavelength conversion element is incident.

7. A light source apparatus comprising:
a light emitter that outputs excitation light; and
the wavelength conversion element according to claim 1.

8. A projector comprising:
the light source apparatus according to claim 7;
a light modulator that modulates light outputted from the light source apparatus; and
a projection optical apparatus that projects the light modulated by the light modulator.

9. A wavelength conversion element comprising:
a phosphor layer that emits fluorescence when excitation light is incident on the phosphor layer;
a base having a reflection layer; and
a filter provided on a side of the phosphor layer that is a side opposite the reflection layer,
wherein the filter transmits excitation light incident on the filter at right angles out of the excitation light and fluorescence incident on the filter at right angles out of the fluorescence and reflects fluorescence incident on the filter at a second angle of incidence out of the fluorescence in such a way that optical intensity of the reflected fluorescence is higher than optical intensity of transmitted fluorescence.

10. The wavelength conversion element according to claim 9, wherein the fluorescence is light containing green light and highly visible red light, and the filter reflects at least part of red light incident on the filter at right angles and less visible than the highly visible red light.

11. A wavelength conversion system comprising:
the wavelength conversion element according to claim 10; and
a pickup system on which the fluorescence emitted from the wavelength conversion element is incident.

12. A light source apparatus comprising:
a light emitter that outputs excitation light; and
the wavelength conversion element according to claim 10.

13. A projector comprising:
the light source apparatus according to claim 12;
a light modulator that modulates light outputted from the light source apparatus; and
a projection optical apparatus that projects the light modulated by the light modulator.

14. A wavelength conversion system comprising:
the wavelength conversion element according to claim 9; and
a pickup system on which the fluorescence emitted from the wavelength conversion element is incident.

15. A light source apparatus comprising:
a light emitter that outputs excitation light; and
the wavelength conversion element according to claim 9.

16. A projector comprising:
the light source apparatus according to claim 15;
a light modulator that modulates light outputted from the light source apparatus; and
a projection optical apparatus that projects the light modulated by the light modulator.

17. A wavelength conversion element comprising:
a phosphor layer that emits fluorescence when excitation light is incident on the phosphor layer;
a first filter provided on a side of the phosphor layer that is a side on which the excitation light is incident;
a second filter provided on a side of the phosphor layer that is a side opposite the first filter; and
a base on which the phosphor layer on which the first filter and the second filter are provided is provided and which transmits the fluorescence, wherein the first filter transmits excitation light incident on the first filter at right angles out of the excitation light, reflects excitation light incident on the first filter at a third angle of incidence out of the excitation light in such a way that optical intensity of the reflected excitation light is higher than optical intensity of transmitted excitation light, and reflects fluorescence incident on the first filter at right angles out of the fluorescence, and the second filter transmits fluorescence incident on the second filter at right angles out of the fluorescence, reflects the fluorescence incident on the second filter at a fourth angle of incidence in such a way that optical intensity of the reflected fluorescence is higher than optical intensity of transmitted fluorescence, and reflects excitation light incident on the second filter at right angles out of the excitation light.

18. A wavelength conversion system comprising:
the wavelength conversion element according to claim 17; and
a pickup system on which the fluorescence emitted from the wavelength conversion element is incident.

19. A light source apparatus comprising:
a light emitter that outputs excitation light; and
the wavelength conversion element according to claim 17.

20. A projector comprising:
the light source apparatus according to claim 19;
a light modulator that modulates light outputted from the light source apparatus; and
a projection optical apparatus that projects the light modulated by the light modulator.

* * * * *